United States Patent
Hautala et al.

(10) Patent No.: US 11,334,830 B2
(45) Date of Patent: May 17, 2022

(54) SYSTEM AND METHOD FOR CRISIS AND BUSINESS RESILIENCY MANAGEMENT

(71) Applicant: JPMorgan Chase Bank, N.A., New York, NY (US)

(72) Inventors: Eric John Hautala, Rockland, MA (US); Mary Jane Tohlen, Salem, MO (US); Robert Anthony Fucito, Jackson, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 973 days.

(21) Appl. No.: 15/500,211

(22) PCT Filed: Jul. 16, 2015

(86) PCT No.: PCT/US2015/040704
§ 371 (c)(1),
(2) Date: Jan. 30, 2017

(87) PCT Pub. No.: WO2016/018637
PCT Pub. Date: Feb. 4, 2016

(65) Prior Publication Data
US 2017/0278031 A1    Sep. 28, 2017

Related U.S. Application Data

(60) Provisional application No. 62/029,714, filed on Jul. 28, 2014.

(51) Int. Cl.
*G06Q 10/00* (2012.01)
*G06Q 40/00* (2012.01)
(Continued)

(52) U.S. Cl.
CPC ......... *G06Q 10/0633* (2013.01); *G06Q 10/06* (2013.01); *G06Q 40/06* (2013.01); *G06Q 50/18* (2013.01); *G06Q 50/265* (2013.01)

(58) Field of Classification Search
None
See application file for complete search history.

(56) References Cited

U.S. PATENT DOCUMENTS 7,305,392 B1 * 12/2007 Abrams ................. G06Q 10/06
707/770
7,409,428 B1 * 8/2008 Brabec ................... H04L 51/34
709/206

(Continued)

OTHER PUBLICATIONS

International Search Report and Written Opinion dated Oct. 9, 2015; PCTUS2015/040704.

*Primary Examiner* — Hafiz A Kassim
*Assistant Examiner* — Matheus Ribeiro Stivaletti
(74) *Attorney, Agent, or Firm* — Greenblum & Bernstein, P.L.C.

(57) ABSTRACT

Methods and systems for providing a crisis management platform are described. A method includes receiving a first notification of an event, such as a crisis event. A second notification of the event is transmitted to user equipment devices of a plurality of individuals. A user selection of a crisis-related option from a plurality of crisis-related options is received after transmitting the second notification is transmitted, and an action is taken in response to receiving the user selection of the crisis-related option. An electronic document is designed and distributed as a portable tool with easily accessible information for a crisis team to use as a straightforward reference to manage the decisioning and workflow coordination related to crisis management. Interactive user interfaces with hyperlinks to various electronic resources and tools may be provided to automatically and methodologically inform various users of their roles and guide them through a crisis response procedure.

18 Claims, 18 Drawing Sheets

(51) Int. Cl.
  *G06Q 50/00* (2012.01)
  *G06Q 10/06* (2012.01)
  *G06Q 40/06* (2012.01)
  *G06Q 50/18* (2012.01)
  *G06Q 50/26* (2012.01)

(56) References Cited

U.S. PATENT DOCUMENTS

| | | | | |
|---|---|---|---|---|
| 2005/0114829 A1* | 5/2005 | Robin | ................ | G06Q 10/06 |
| | | | | 717/101 |
| 2009/0063234 A1* | 3/2009 | Refsland | ................ | G16H 40/20 |
| | | | | 705/7.15 |
| 2009/0089097 A1* | 4/2009 | Schoenberg | ........... | G16H 40/67 |
| | | | | 705/3 |
| 2009/0234690 A1* | 9/2009 | Nikipelo | ........ | G06Q 10/06311 |
| | | | | 705/7.13 |
| 2010/0057502 A1 | 3/2010 | Arguelles et al. | | |
| 2010/0153156 A1* | 6/2010 | Guinta | ............... | G06Q 10/0635 |
| | | | | 705/7.28 |
| 2010/0185666 A1 | 7/2010 | Crow et al. | | |
| 2010/0324946 A1* | 12/2010 | Ohmura | ............. | H04L 12/1818 |
| | | | | 705/5 |
| 2011/0111728 A1* | 5/2011 | Ferguson | ........... | H04M 1/72424 |
| | | | | 455/404.2 |
| 2011/0117878 A1* | 5/2011 | Barash | ................ | G08B 25/005 |
| | | | | 455/404.2 |
| 2011/0130636 A1* | 6/2011 | Daniel | .................... | G08B 21/02 |
| | | | | 600/301 |
| 2013/0024382 A1* | 1/2013 | Dala | ................... | G06F 21/6245 |
| | | | | 705/51 |
| 2013/0332474 A1* | 12/2013 | Glaubman | ............... | G06F 8/31 |
| | | | | 707/755 |
| 2014/0032255 A1* | 1/2014 | Hegazi | ............ | G06Q 10/06312 |
| | | | | 705/7.22 |
| 2014/0096033 A1* | 4/2014 | Blair | ....................... | H04L 51/04 |
| | | | | 715/752 |
| 2014/0364081 A1* | 12/2014 | Rauner | ................ | G08B 25/016 |
| | | | | 455/404.2 |
| 2014/0365390 A1* | 12/2014 | Braun | ................... | H04W 4/023 |
| | | | | 705/325 |
| 2014/0368643 A1* | 12/2014 | Siegel | ................ | G08B 13/19695 |
| | | | | 348/143 |
| 2014/0378082 A1* | 12/2014 | Ros | ......................... | H04W 4/90 |
| | | | | 455/404.1 |
| 2015/0111524 A1* | 4/2015 | South | .................... | H04W 4/021 |
| | | | | 455/404.2 |
| 2015/0187203 A1* | 7/2015 | Mohler | ................ | G08B 27/005 |
| | | | | 340/539.13 |
| 2015/0269700 A1* | 9/2015 | Miasnik | ............... | G06Q 50/265 |
| | | | | 705/325 |
| 2015/0317809 A1* | 11/2015 | Chellappan | ......... | G01C 21/362 |
| | | | | 455/404.1 |
| 2017/0325056 A1* | 11/2017 | Mehta | .................... | H04M 11/04 |
| 2019/0082312 A1* | 3/2019 | Neybert | ................ | H04W 4/21 |
| 2019/0174208 A1* | 6/2019 | Speicher | .............. | H04W 84/18 |
| 2019/0266674 A1* | 8/2019 | Kownacki | ............. | G06Q 50/26 |
| 2019/0287201 A1* | 9/2019 | Orduna | ............... | G08B 21/0261 |
| 2019/0357031 A1* | 11/2019 | Wickham | ............... | H04W 4/029 |

* cited by examiner

FIG. 7

Event Timeline

| Time | Initial Assessment | Triage | Activate Crisis Command Center | Hold & Monitor |
|---|---|---|---|---|
| | (Click here) | (Click here) | (Click here) | (Click here) |
| Immediate | ☐ Core Team is made aware of potential Crisis<br>☐ Oversight Team member is notified | | | |
| 15 mins | | ☐ Determine who is needed to assess situation<br>☐ Determine next steps; Activate Crisis Command Center, Hold and Monitor, or Stand Down | | |
| within 1 hr | | | ☐ Assign Crisis roles<br>☐ Determine Crisis Team<br>☐ Notify Crisis Team<br>☐ Establish Crisis Command Center<br>☐ Assess impacts<br>☐ Send Flash message, if needed<br>☐ Conduct initial Crisis Command Team meeting<br>☐ Begin staff assessment, if needed<br>☐ Initial Status update | ☐ Assess situation<br>☐ Send status |
| 1-2 hrs | | | ☐ Begin internal and external communications per guidelines<br>☐ Monitor reported impacts<br>☐ Monitor crisis event thru appropriate channels<br>☐ Begin provisioning additional resources (equipment, personnel, travel, hotels, food, etc) | ☐ Assess situation<br>☐ Send status update as appropriate |
| 2-4 hrs | | | ☐ Monitor reported impacts<br>☐ Monitor crisis event thru appropriate channels<br>☐ Conduct crisis command center meetings as needed<br>☐ Provide status update as needed<br>☐ Continue internal and external communications per guidelines<br>☐ Continue provisioning additional resources (equipment, personnel, travel, hotels, food, etc) | ☐ Assess situation<br>☐ Send status update as appropriate |

Return

FIG. 8

Initial Assessment

☐ 1 - Core Team Member is made aware of a potential crisis event; via
- PAC notification
- GS notice
- BRC notification
- LOB notification
- Personal experience
- Other methods ☐ 2 – a.) Core Team Member reviews the Incident Watch Matrix to determine next communication steps
– b.) Review for Business Impact and Org presence ☐ 3 – Contact local SIMT member / site BRC to find out impact of incident ☐ 4 – Core Team Member notifies via email Regional Team and cc Global Head, describing outreach and business impact ☐ 5 – If Activation Triggers are met, notify Team A per the following two (2) distribution lists, cc'ing Team B et al.:
  ○ Org Business and Operational Controls – Direct Reports
  ○ Org Business and Operational Controls – Management Team ☐ 6 – These individuals meet (others may be brought in at their discretion) to determine result
- Invoke Triage (used when more input is needed)
- Activate Crisis Command Center immediately

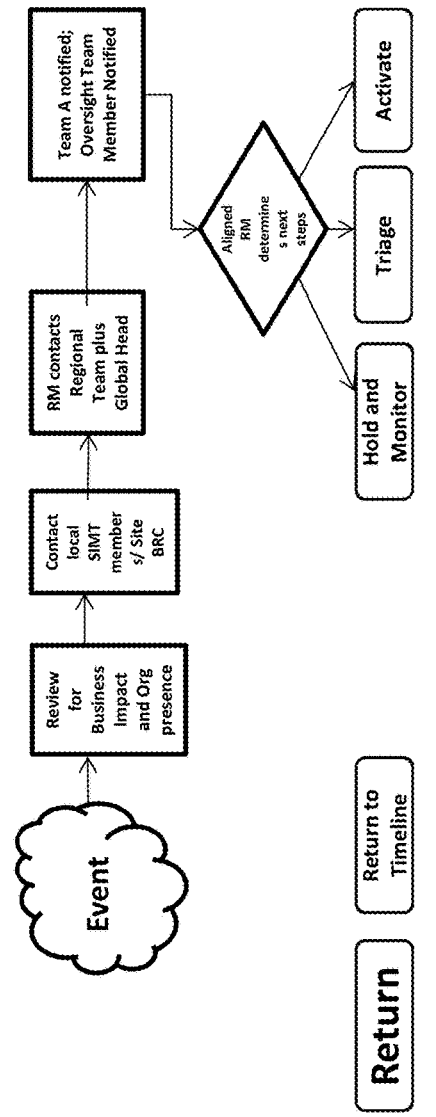

Return | Return to Timeline

FIG. 10

Activation Triggers

- ☐ Loss of major building/zone/Data center, i.e.. LOB impact
- ☐ Life Safety disruption or impact to XYZ staff with potential business impact
- ☐ LOB impact from major Industry utility outage/counterparty failure
- ☐ Impact to several key clearing/ trading / settlement deadlines, ie. Market impact
- ☐ Activation of a business continuity plan
- ☐ Pre-event planning of impending threat (day 1), post GS alert
- ☐ Activation of Regional Crisis Management Team [RCMT]

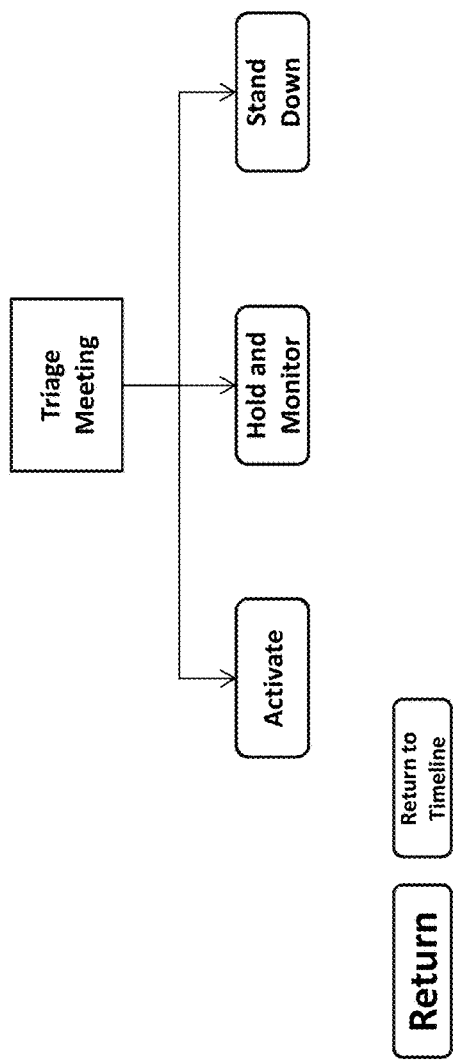

FIG. 14

Roles and Responsibilities Definitions

Crisis Management Team

The purpose of the Crisis Management Team is to:
- ☐ 1 - Ensure the safety and security of all personnel
- ☐ 2 - Manage the overall response to a crisis
- ☐ 3 - Maintain continuity of the business after a disruption
- ☐ 4 - Safeguard the reputation and corporate survival of the organization by communication and responding effectively during a crisis To ensure that the response to a crisis conveys confidence in the company and mitigates possible concerns to the public, Senior Executives:
- ☐ 1 - Are activated as needed to the Crisis Team
- ☐ 2 - Receive status updates by the Crisis Team
- ☐ 3 - Provide strategic direction and decision making as required
- ☐ 4 - Are alternate Chairpersons as required (applicable to specific team members)
- ☐ 5 - Maintain dual roles on Crisis Team (applicable to specific team members)
- ☐ 6 - Corporate Spokesperson (applicable to specific team members)

[Return] [Return to Timeline]

FIG. 17

Tools -- Communication Model

All Communication must comply w/ External Communication Protocol

| | Purpose | Tool / Mailbox | Template | Distribution Lists | Approval |
|---|---|---|---|---|---|
| C-1 | Activate triage | •Phone / OC Chat / email | n/a | •4-10 individuals determined at time of event | •Oversight Team Member |
| C-2 | Results of Triage – Hold and Monitor | •Org Resiliency Crisis Communication mailbox | Hold and Monitor Template •Page 51 | •Org Resiliency Team •Those involved in triage •Others at discretion of Oversight Team Member | •Oversight Team Member |
| C-3 | Results of Triage – Immediate Stand Down | •Org Resiliency Crisis Communication mailbox | Stand Down Template •Page 52 | •Org Resiliency Team •Those involved in triage •Others at discretion of Oversight Team Member | •Oversight Team Member |
| C-4 | Optional Sr. Mgmt Flash –Message of Invocation or Executive Communication (ongoing) | •Org Resiliency Crisis Communication mailbox | Sr. Mgmt Flash Template •Page 53-54 | •Org Resiliency Org Exec Mgmt – 3, with approval •Org Crisis Team | •Oversight Team Member |
| C-5 | Activate Crisis Mgmt | •Everbridge | Activate Crisis Mgmt Template •Page 47-48 (EB); 58 | •Org Crisis Team •See pg 47-48 for Org Everbridge lists (IB Org) | •Oversight Team Member |
| C-6 | Crisis Meeting Status Update | •Org Resiliency Crisis Communication mailbox | Crisis Mtg Update Template •Page 56 | •Org Resiliency Org Exec Mgmt – 3, with approval •Org Crisis Team | •Oversight Team Member |
| C-7 | Crisis mgmt meeting notice | •Org Resiliency Crisis Communication mailbox | Calendar invite | •Org Crisis Team | |
| | Crisis related ad hoc messages | •Org Resiliency Crisis Communication mailbox | Free form based on content | •Org Resiliency Org Exec Mgmt – 3, with approval; Org Crisis Team | •Oversight Team Member |

{ C-1 to C-3: Triage }
{ C-4 to C-6: Activate }

Return

SYSTEM AND METHOD FOR CRISIS AND BUSINESS RESILIENCY MANAGEMENT

CROSS-REFERENCE TO RELATED APPLICATION(S)

The present application is a national phase application based on PCT Application No. PCT/US2015/040704, filed Jul. 16, 2015, which claims priority to, and the benefits of, U.S. Provisional Application No. 62/029,714, filed on Jul. 28, 2014. Each of these related applications is incorporated herein by reference in its entirety.

TECHNICAL FIELD

Embodiments of the invention relate generally to workflow management and, more specifically, to providing an interactive system and method for crisis and business resilience management.

BACKGROUND

Crisis management is a process in which an organization (such as a corporation, a government entity, etc.) attempts to mitigate the effects of a threatening event before, during, or after the event has occurred. Crisis management differs from risk management in the sense that, while risk management is focused on finding ways to avoid the event, crisis management is focused on the effects of the event and managing the potential or actual chaos and disorder that have resulted or are likely to result from the event.

Crisis management in a corporate setting may involve events that threaten to harm the corporate infrastructure as well as stakeholders and clients. Examples of crises faced by corporations can be diverse, including, for example, financial events (e.g., economic downturns), legal issues (e.g., lawsuits, criminal allegations, etc.), as well as natural phenomena (e.g., infrastructure disabling storms or earthquakes). Accordingly, corporations have developed written policies for identifying, assessing, understanding, and coping with crises from the moment a crisis first occurs to the point that the recovery procedures start. In general, however, these approaches are often not streamlined, not universally applicable to all types of crises, and are often employed inconsistently from crisis to crisis as well as internally from corporate site to corporate site.

Emergency alert or mass notification systems were also implemented to broadcast warnings or notifications about crisis situations. However, such systems are limited to one-way communications and typically rely on human operators to prepare the content of the warnings or notifications.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which:

FIGS. 6-18 show exemplary user interface screens displaying features of an electronic tool for crisis management in accordance with embodiments of the invention.

SUMMARY OF THE INVENTION

Figure 1:
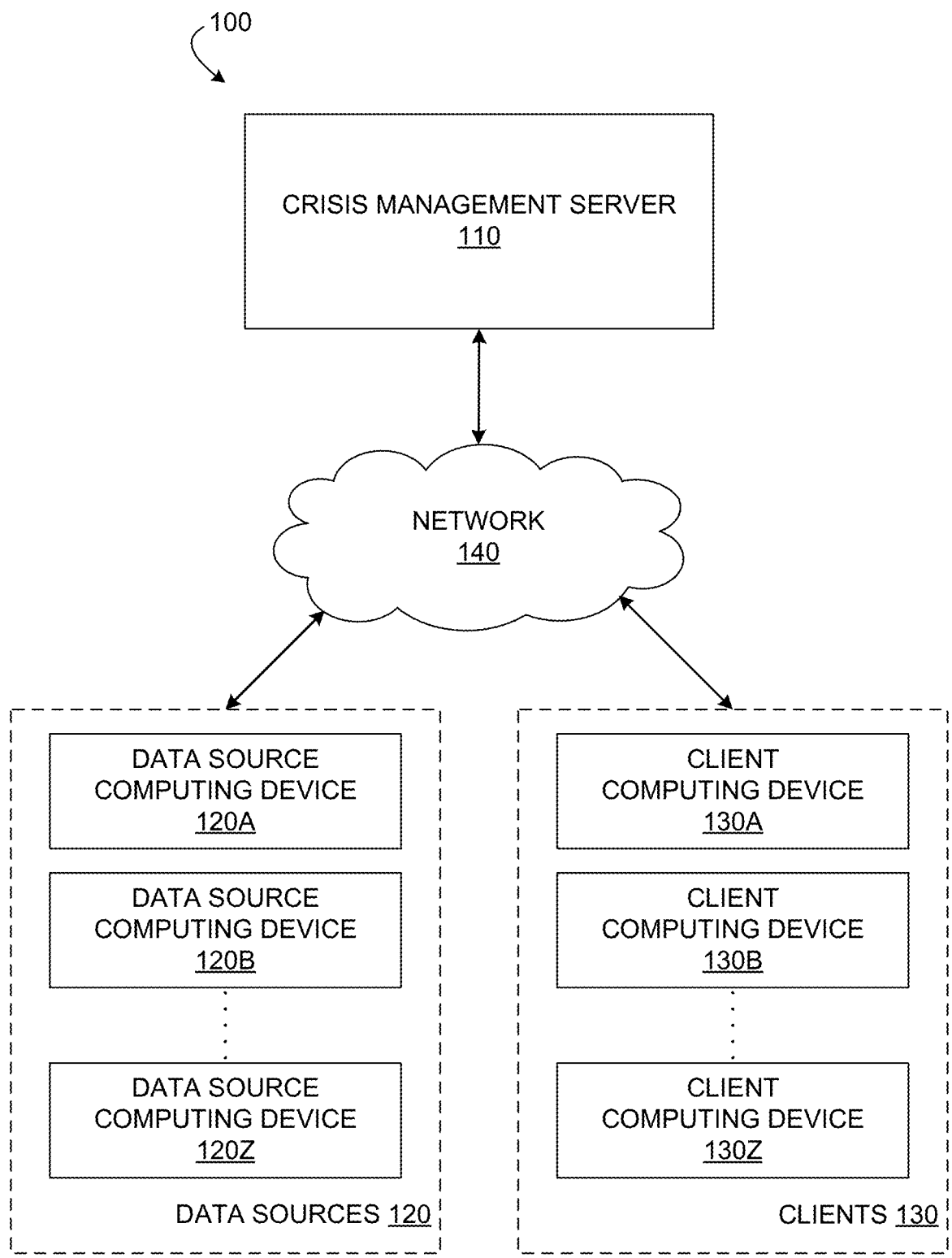
FIG. 1 is a block diagram illustrating an exemplary computer network in which embodiments of the present invention may operate.

Disclosed herein are systems and methods for providing a crisis management platform that allow for efficient and effective crisis management using live tools, templates, and guides for a consistent, globally-unified approach to crisis responses within an organization. According to embodiments of the present invention, an electronic document may be designed and distributed as an essential portable tool with easily accessible information for the a crisis team to use as a straightforward reference to manage the decisioning and workflow coordination related to crisis management. For example, interactive user interfaces with hyperlinks to various electronic resources and tools may be provided to automatically and methodologically inform various users of their roles and guide them through a crisis response procedure.

According to one particular embodiment of the present invention, a number of interactive user interfaces may be provided to instruct and coordinate participants in a crisis management procedure, such as displaying a predefined framework or timeline for crisis responses, predefined roles and responsibilities of participants in the crisis management procedure, and step-by-step instructions for the participants to carry out the crisis management procedure according to their respective roles and responsibilities.

According to another particular embodiment of the present invention, a user interface may be provided to display an interactive event timeline comprising prompts and options for user actions at a predefined pace. The event timeline or related crisis response protocols and instructions may be modified or updated during or after a crisis event.

According to yet another embodiment, communications may be automatically initiated to provide alerts, notifications, and/or instructions to some or all of the participants in the crisis management procedure upon occurrence of a crisis event. For example, a method may include receiving a first notification of an event, such as a crisis event. A second notification of the event is transmitted to user equipment devices of a plurality of individuals (e.g., personnel who may have been designated as "first-responders" to the crisis). A user selection of a crisis-related option from a plurality of crisis-related options is received after transmitting the second notification. For example, the crisis-related options may include, but are not limited to, an "activate" option which may serve as an activation command for triggering a cascade of relevant protocols to handle the event, a "hold and monitor" option to allow time to assess the situation, and a "stand down" option when no further action is to be taken.

The systems and methods described herein may serve as a central point of control for the organization and provide facilitation and coordination during crisis situations. Moreover, the disclosed embodiments can be leveraged across all lines of business for their adaptation, saving time, reducing risk, and streamlining communication.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

DETAILED DESCRIPTION

Some portions of the detailed descriptions may be presented in terms of algorithms and symbolic representations of operations on data bits within a computer memory. These algorithmic descriptions and representations correspond to the terminology used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the description that follows, it is appreciated that throughout the description, discussions utilizing terms such as "receiving", "detecting", "monitoring", "generating", "calculating", "transmitting", "enrolling", "identifying", "measuring", "recommending", "designating", "increasing", "issuing", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relate to an apparatus for performing the operations herein. This apparatus may be specially constructed for the required purposes or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the relevant method steps. The structure for a variety of these systems will be apparent from the description that follows. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating an exemplary computer network 100 in which embodiments of the present invention may operate. Referring to FIG. 1, computer network 100 may include a crisis management server 110, a plurality of data source computing devices 120A-120Z, which are associated with and collectively referred to herein as data sources 120. Computer network 100 may also include a plurality of client computing devices 130A-130Z, which are associated with and may be collectively referred to herein as clients 130. Crisis management server 110 may be communicatively coupled directly or via a communications network 140. Although crisis management server 110 is depicted as a single server, crisis management server 110 may be one or more computing devices (such as a rackmount server, a router computer, a server computer, a personal computer, a mainframe computer, a laptop computer, a tablet computer, a desktop computer, etc.), and include one or more data stores (e.g., hard disks, memories, databases), networks, software components, and/or hardware components. Data source computing devices 120A-120Z associated with data sources 120 may be communicatively coupled to communications network 140 via any one of a plurality of communication channels (e.g., e-mail, SMS service, automated voice message, etc.). Similarly, client computing devices 130A-130Z associated with clients 130 may also be communicatively coupled to communications network 140 via any one of the plurality of communication channels. Communications network 140 may be a private network (e.g., a local area network (LAN), wide area network (WAN), intranet, etc.), a public network (e.g., the Internet), a cellular network or any combination thereof.

Figure 2:
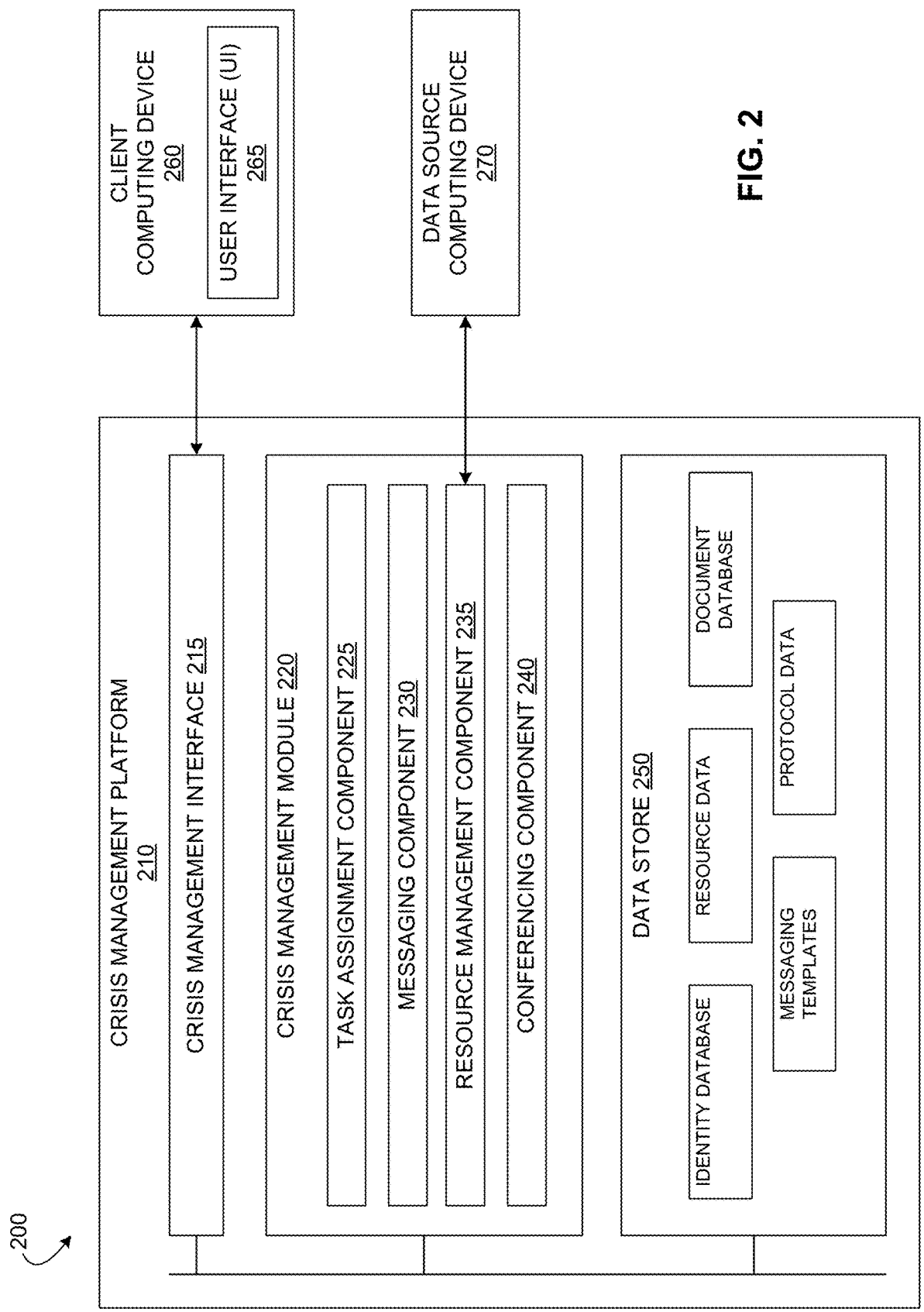
FIG. 2 is a block diagram illustrating an exemplary crisis management system in accordance with an embodiment of the invention.

FIG. 2 is a block diagram illustrating an exemplary crisis management system 200 in accordance with an embodiment of the invention. Crisis management system 200 may be the same or similar to, and have the same functionality and connectivity as, computer network 100 described with respect to FIG. 1. Crisis management system 200 may include a computer-implemented crisis management platform 210, which may be implemented by a server (e.g., crisis management server 110), one or more client computing devices 260 (which may correspond to one or more of client computing devices 130A-130Z), and one or more data source computing devices 270 (which may correspond to one or more of data source computing devices 120A-120Z). In some implementations, some or all of the functionality of crisis management platform 210 is implemented on one or more of client computing device 260, data source computing device 270, or another device. Each of client computing device 260 and data source computing device 270 may be communicatively coupled to each other and to crisis management platform 210 via a communications network (e.g., communications network 140).

Crisis management platform 210 may include one or more modules configured to provide crisis management services. Crisis management platform 210 includes crisis management interface 215, crisis management module 220, and data store 250. The crisis management module 220 includes a task assignment component 225, a messaging component 230, a resource management component 235, and a conferencing component 240. More or less modules and components may be included in crisis management platform 210 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

In one embodiment, crisis management interface 215 may be communicatively coupled to client computing device 260. Client computing device 260 may be referred to as a "user device". An individual user may be associated with (e.g., own and/or operate) client computing device 260, and may also be associated with additional client computing devices (e.g., one or more of client computing devices 130A-130Z). Client computing device 260 may be owned and utilized by different users at different locations. Client computing device 260 includes a user interface (UI) 265, which allows the user to send and receive information to crisis management platform 210 via crisis management interface 215. For example, UI 265 may be a web browser interface that can access, retrieve, present, and/or navigate content (e.g., web pages such as Hyper Text Markup Language (HTML) pages) provided by crisis management platform 210. In one embodiment, UI 265 may be a standalone application (e.g., a mobile app), which may have been provided to the user by crisis management interface 215, and allows the user to send and receive information to crisis management interface 215. In one embodiment, UI 265 may be implemented as an interactive slide show presentation document, as illustrated in FIGS. 6-18.

In one embodiment, crisis management platform 210 may include crisis-related resources, which may be stored and maintained in data store 250. In one embodiment, the data store 250 may be a memory (e.g., random access memory), a cache, a drive (e.g., a hard drive), a flash drive, a database system, or another type of component or device capable of storing data. The data store 250 may also include multiple storage components (e.g., multiple drives or multiple databases) that may also span multiple computing devices (e.g., multiple server computers), and may be cloud-based. In some embodiments, the data store 250 may be separate from crisis management platform 210, and may be, for example, distributed among and accessible to client computing device 260, data source computing device 270, and other devices.

The crisis-related resources may include, for example, an identity database (for keeping track relevant personnel), resource data (such as external resources to aid in crisis management), a document database (for keeping track of crisis-related documents such as reports, meeting minutes, etc.), messaging templates (for transmitting messages and indications to relevant personnel), and protocol data (which may summarize actions to be taken in response to notifications).

In one embodiment, task assignment component 225 may assign crisis-specific tasks to relevant personnel (e.g., personnel corresponding to identities stored in the identity database). The personnel may be assigned specific tasks automatically by the crisis management module 220, by a user of the client computing device 260, or both. In one embodiment, messages and event indications are transmitted to personnel based on an assigned task.

In one embodiment, messaging component 230 allows for the user to generate messages (e.g., from pre-defined message templates) and have these message transmitted to relevant personnel.

In one embodiment, resource management component 235 may provide the user with several crisis-related resources. Illustrative crisis-related resources are shown in FIGS. 6-18.

In one embodiment, conferencing component 240 allows for the audio/video conferencing between client computing devices (e.g., one or more of client computing devices 130A-130Z). The user of client computing device 260 may, for example, initiate a conference with other users/personnel at any time by transmitting a conference request to the crisis management interface 215, in which the request includes a list of identities of personnel. In some embodiments, the messaging component 230 automatically determines identities of personnel with whom the user is to have a conference with. For example, the messaging component 230, in response to the user selecting a crisis-related option, may identify within stored protocol data that, at a particular time, particular personnel are to be contacted. The conference is then automatically initiated and the relevant personnel are identified from the identity database and invited to or scheduled to participate in the conference.

Figure 3:
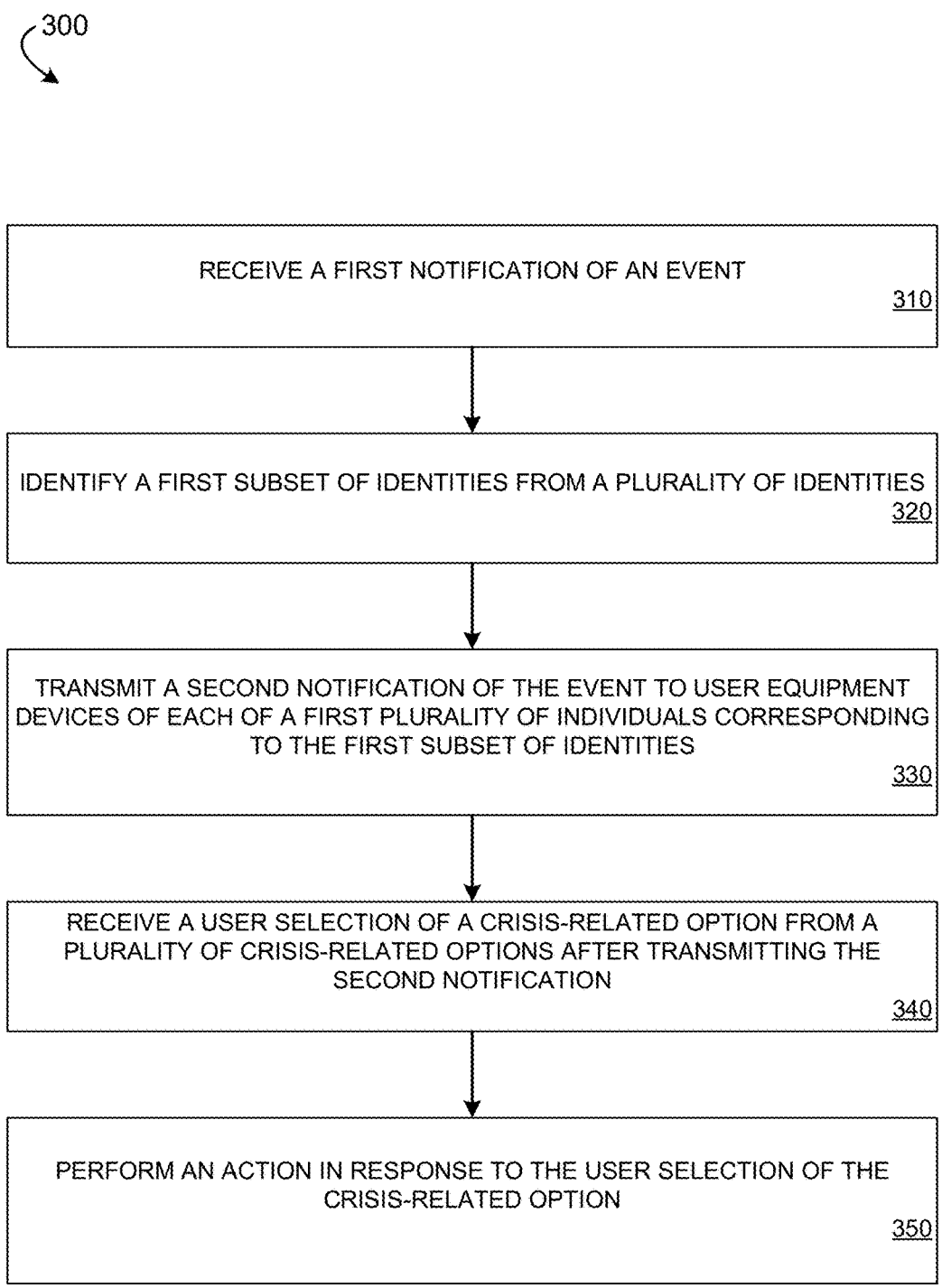
FIG. 3 is a flow diagram illustrating a method for providing crisis management services in accordance with an embodiment of the invention.
Figure 4:
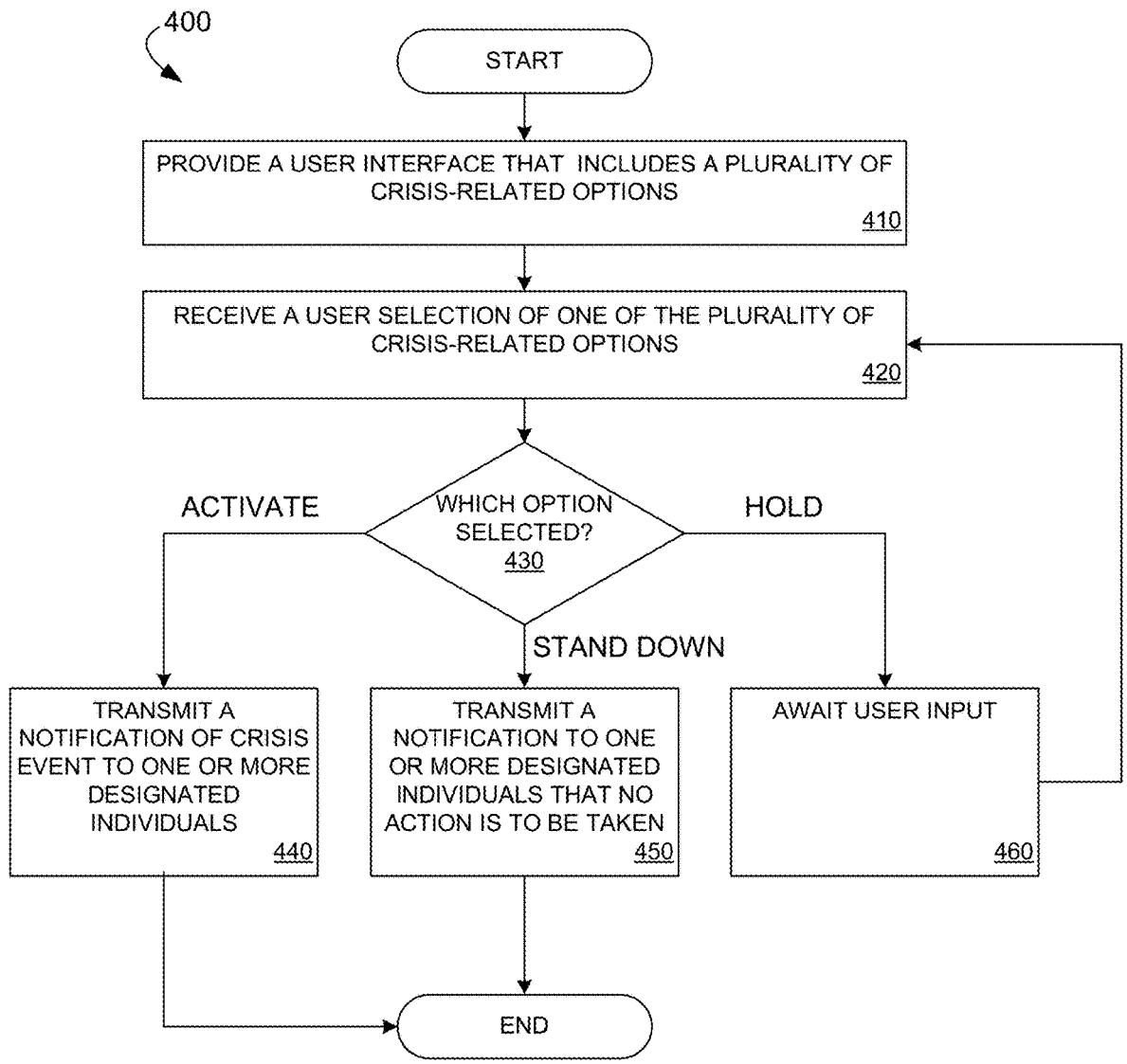
FIG. 4 is a flow diagram illustrating a method for providing a crisis management interface in accordance with an embodiment of the invention.

As illustrated in FIGS. 3 and 4, each of methods 300 and 400, respectively, may be performed by processing logic that may include hardware (e.g., circuitry, dedicated logic, programmable logic, microcode, etc.), software (such as instructions run on a processing device), or a combination thereof. In one embodiment, methods 300 and 400 may be performed by one or more processing components associated, respectively, with crisis management interface 215 and crisis management module 220 (which includes task assignment component 225, messaging component 230, resource management component 235, and conferencing component 240) of crisis management platform 210.

FIG. 3 is a flow diagram illustrating a method 300 for providing crisis management services in accordance with an embodiment of the invention. Method 300 begins at block 310, in which a notification of an event is received. The event may correspond to a crisis event. In one embodiment, the notification of the event may be received by a crisis management server (e.g., crisis management server 110 implementing crisis management platform 210). In one embodiment, the notification of the event may have been received from one a client computing device (e.g., client computing device 260), a data source computing device (e.g., data source computing device 270), or from another source.

At block 320, a first subset of identities is identified from a plurality of identities. For example, the plurality of identities may be stored in an identity database (e.g., in data store 250). Each of the plurality of identities may correspond to an individual. The subset of identities may identify particular individuals that have crisis management roles assigned. In one embodiment, the first subset of identities may be identified based on receiving a designation of the identities from a user of the client computing device (e.g., client computing device 260). For example, the user of the client computing device may designate roles for one or more individuals to define the subset of identities. In one embodiment, the subset of identities may have been previously identified. For example, specific individuals may have previously had their roles assigned (e.g., assigned roles stored in data store 250), in which the assigned roles associated with identifies of the individuals defines the subset of identities.

At block 330, a second notification of the event is transmitted to user equipment devices of each of a first plurality of individuals corresponding to the first subset of identities (e.g., using messaging component 230). In one embodiment, the user may specify a messaging template. The second notification may be automatically generated from the messaging template (e.g., using messaging component 230).

At block 340, a user selection of a crisis-related option from a plurality of crisis-related options is received after transmitting the second notification. In one embodiment, the user may use conferencing services to discuss the event with one or more individuals (e.g., using conferencing component 240) prior to the selection of the crisis-related option.

At block 350, an action is performed in response to the user selection of the crisis-related option. The action is described in detail with respect to FIG. 4.

FIG. 4 is a flow diagram illustrating a method 400 for providing a crisis management interface in accordance with an embodiment of the invention. Method 400 begins at block 410, in which a user interface is provided, which includes a plurality of crisis-related options. In one implementation, notification of a crisis may have already been received (e.g., in a similar manner as described with respect to block 310 of FIG. 3).

At block 420, a user selection of one of the plurality of crisis-related options is received. Block 420 may be performed in a manner similar to that described with respect to block 340 of FIG. 3.

At block 430, a determination is made as to which option was selected (e.g., using crisis management interface 215).

If it is determined, at block 430, that an "activate" option (which indicates that a crisis protocol is to take effect) was selected, method 400 proceeds to block 440, in which a notification of the crisis is transmitted to one or more designated individuals (e.g., which may correspond to a subset of identifiers from a plurality of identifiers). Method 400 is then ended, and may be repeated continuously.

If it is determined, at block 430, that a "stand down" option was selected, method 400 proceeds to block 450, in which a notification is transmitted to one or more designated individuals indicating that no action is to be taken. Method 400 is then ended, and may be repeated continuously.

If it is determined, at block 430, that a "hold" option was selected, method 400 proceeds to block 460, in which user input is awaited (e.g., until a new crisis-related option is selected). Method 400 then proceeds to block 420 in which a user selection of one of the crisis-related options is received.

It should be noted that the sequence of operations described in conjunction with methods 300 and 400 may be different from that illustrated, respectively, in corresponding FIGS. 3 and 4, while some operations may be omitted without departing from the nature of the embodiments described herein. It should be appreciated by one of ordinary skill in the art that the blocks illustrated in methods 300 and 400 are provided for purposes of illustrating embodiments of the invention and are in no way intended to be limiting in scope.

In some embodiments, user input may be received by a client computing device (e.g., client computing device 260 implementing UI 265), which may be transmitted to a crisis management server (e.g., crisis management platform 210 implemented on crisis management server 110). In some embodiments, the client computing device implements the functionality of the crisis management server (e.g., some or all of crisis management platform 210 is implemented on client computing device 260). A user interface (e.g, UI 265) may be implemented on the client computing device, which receives the user inputs.

Exemplary user interfaces are shown in FIGS. 6-18 which illustrate some of the functionality described herein from the perspective of the user interface of the client computing device.

Figure 6:
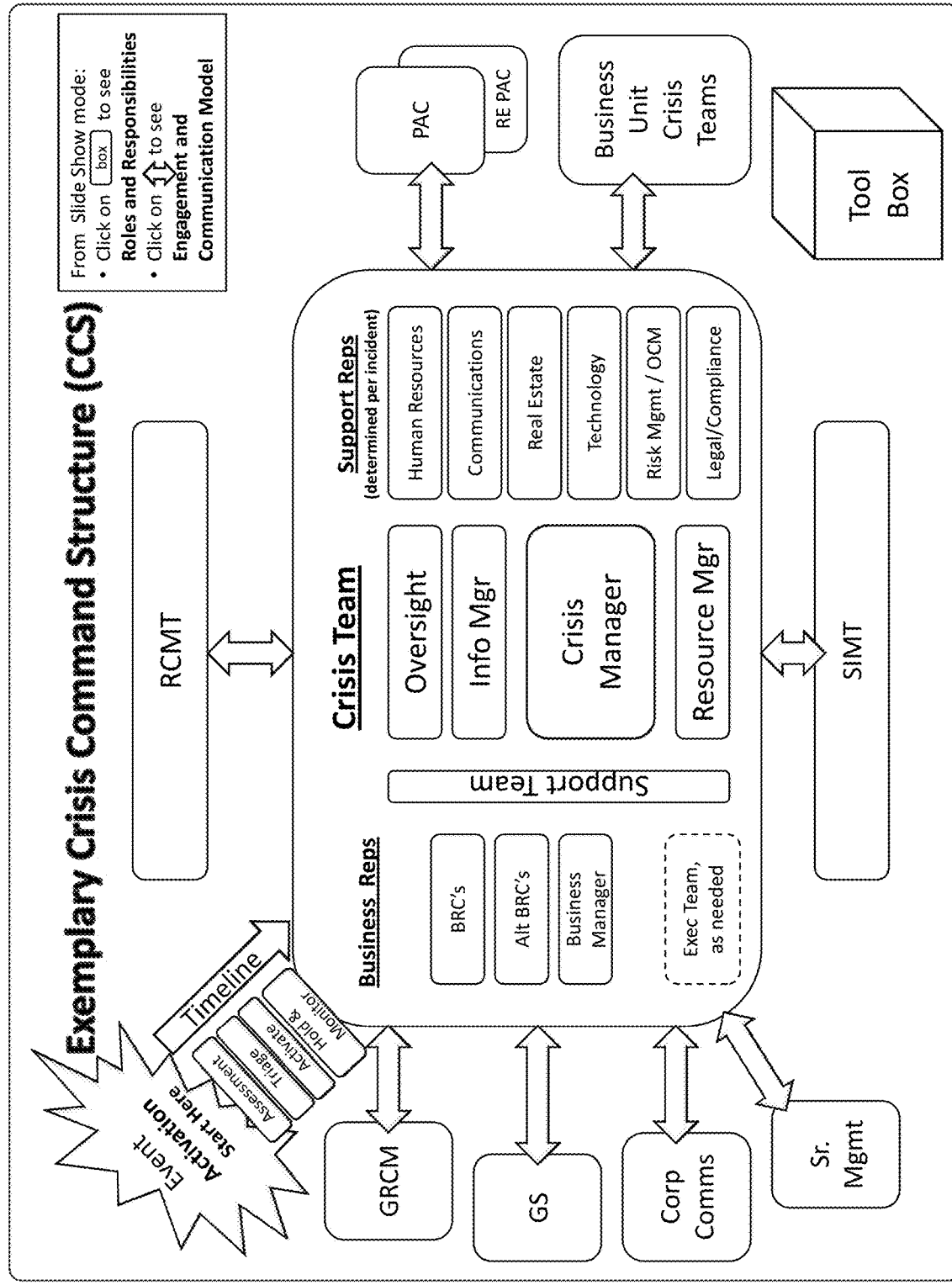
Figure 9:
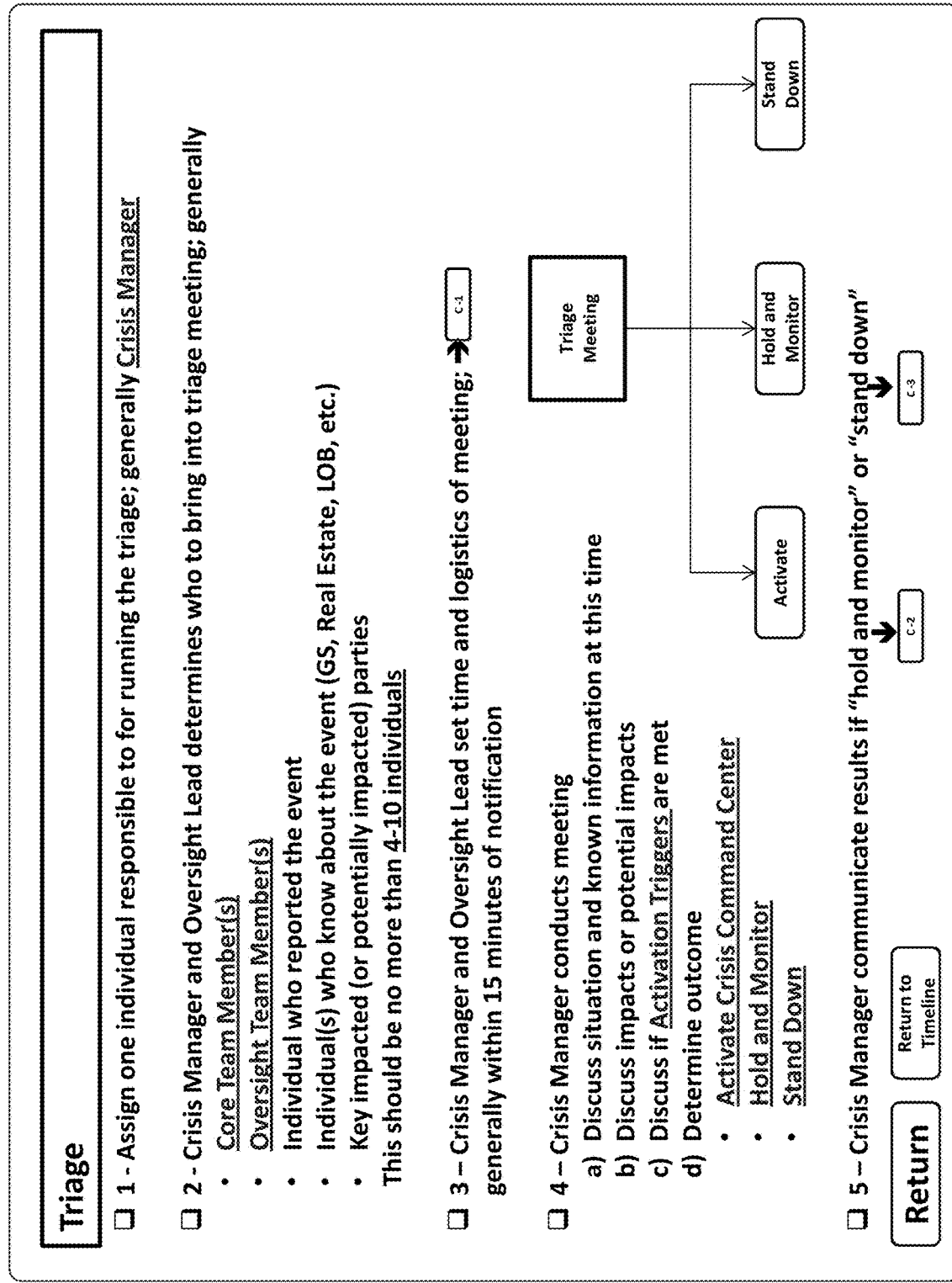
Figure 11:
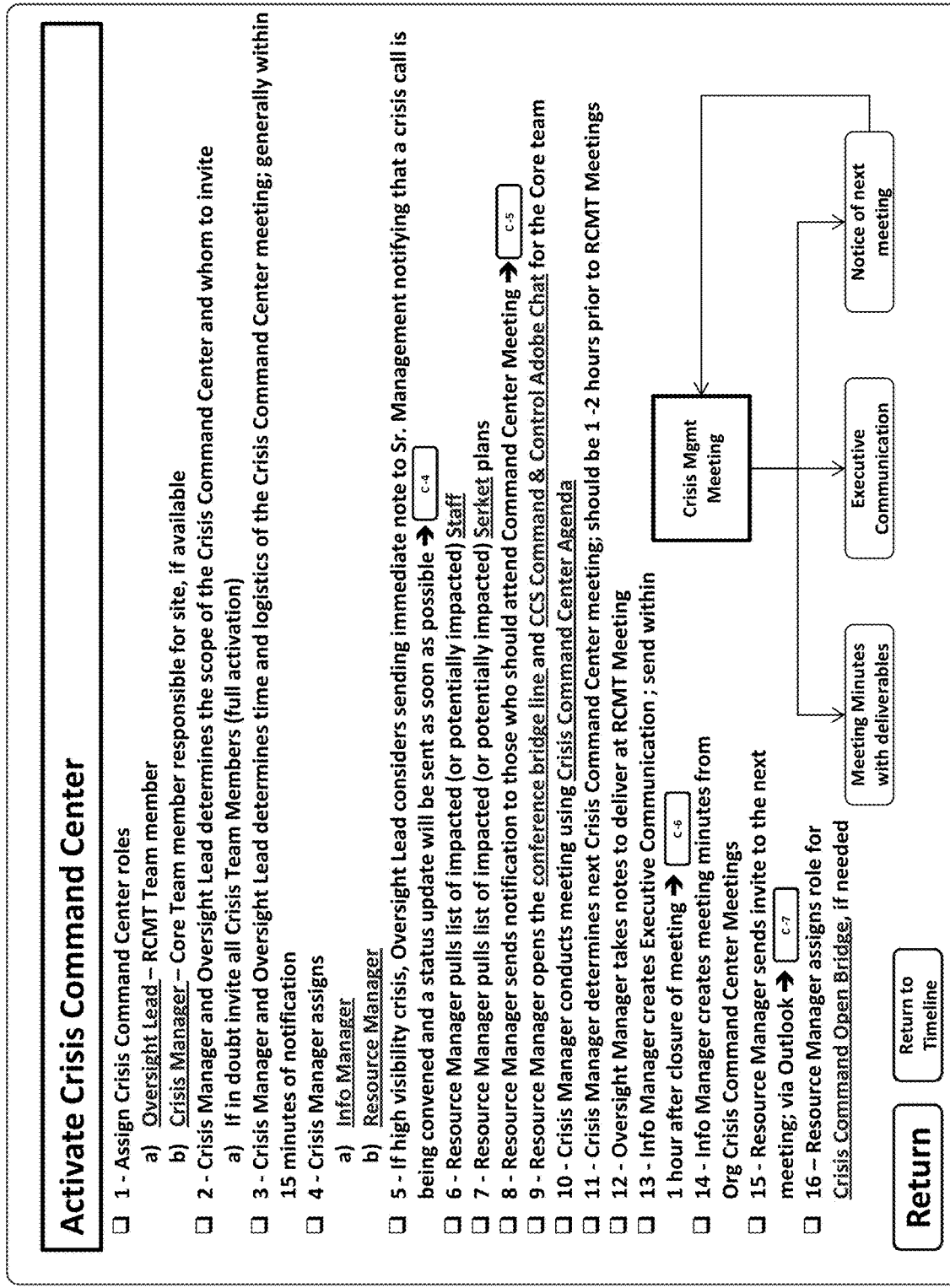
Figure 12:
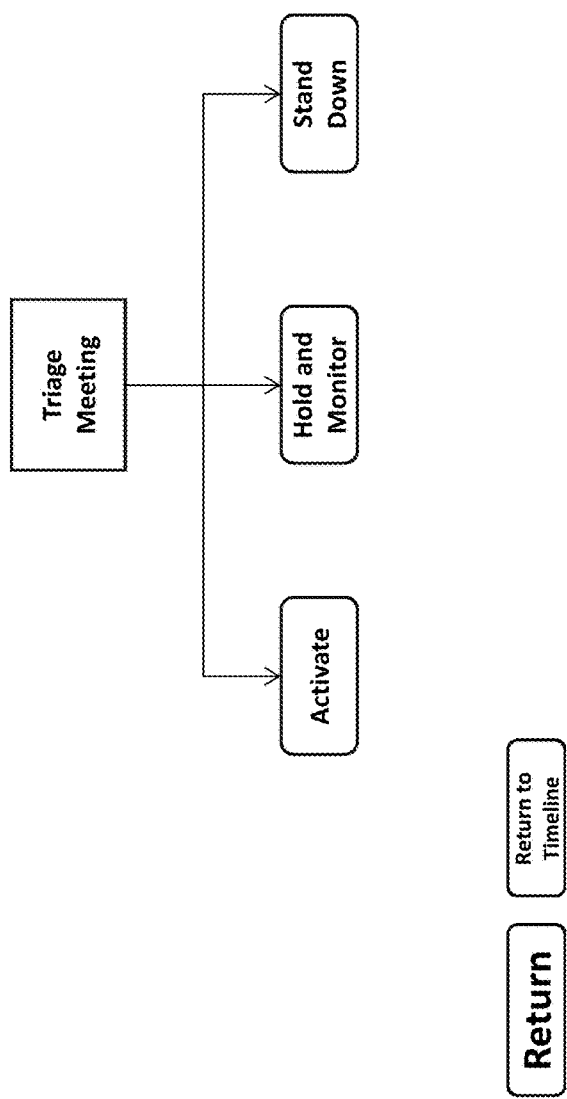
Figure 13:
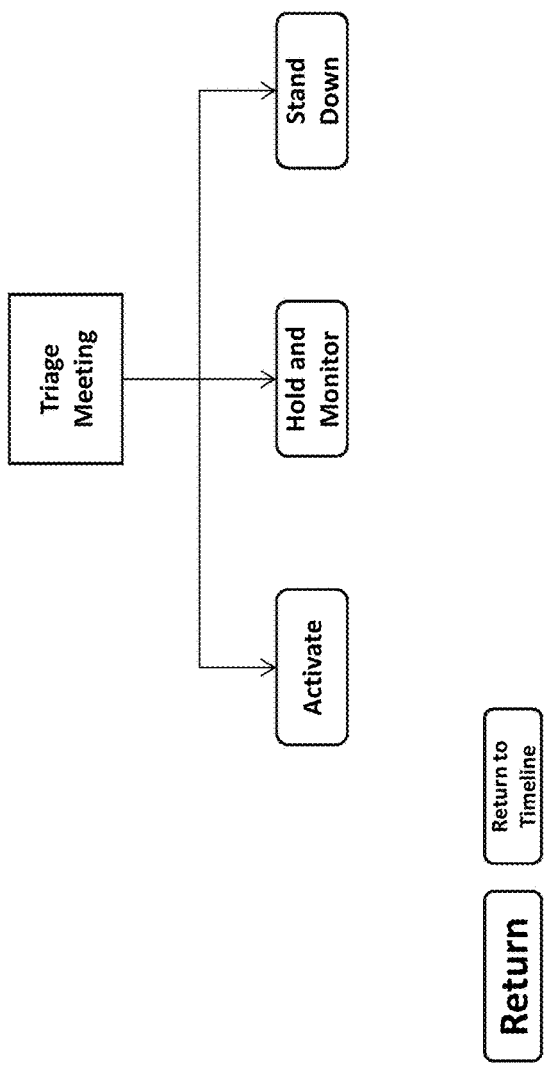

FIG. 6 shows an exemplary "Crisis Command Structure (CCS)" screen which outlines a predefined framework for a crisis management procedure according to one embodiment of the present invention.

In this interactive display, a number of potential participants (e.g., individuals, teams, or entities) are shown in rectangular boxes, such as a Global Resiliency and Crisis Management (GRCM) team, a Global Security (GS) team, a Corporate Communications ("Corp Comms") team, Organization Senior Management ("Org Sr. Mgmt"), Regional Crisis Management Team (RCMT), Site Incident Management Team (SIMT), Business Unit Crisis Teams, Production Assurance Center (PAC) teams, and a Crisis Team. The Crisis Team may further include various members such as Oversight Lead, Information Manager, Crisis Manager, Resource Manager, and so on. The business representatives may include Business Resiliency Coordinators (BRCs), alternative BRCs, and a Business Manager. The Support Representatives, which are determined for each incident, may include personnel from Human Resources, Communications, Real Estate, Technology, Risk Management/OCM (Operations Control Management), and Legal/Compliance teams. Each of these teams and team members may have predefined roles and responsibilities in the crisis management procedure.

By clicking, or hovering a pointer over, a rectangular box displayed in FIG. 6, the role and responsibilities of a corresponding participant in the crisis management procedure may be displayed. FIG. 14 shows an exemplary screen displaying a set of predefined roles and responsibilities of the Crisis Management Team (shown as "Crisis Team" in FIG. 6) according to one embodiment of the present invention. This "Roles and Responsibilities Definitions" screen in FIG. 14 may be reached via hyperlinking from the FIG. 6 screen upon clicking the "Crisis Team" name or box.

FIG. 6 also shows bi-directional arrows connecting the Crisis Team with the various potential participants in the crisis management procedure. Each of these arrows may be clickable to reveal a corresponding set of engagement and communication protocols and/or communication models and templates for interactions between the connected teams or entities during a crisis response.

According to some embodiments of the present invention, the exemplary user interface shown in FIG. 6 may be automatically activated or initiated upon receipt of a notification about a crisis event. For example, triggered by an event alert (e.g., a sudden crash of a relevant stock or other financial instrument, or filing of a legal action), a computer-based crisis management tool may automatically launch this interactive screen as the starting point of the predefined crisis management procedure.

According to one embodiment, a click in the FIG. 6 screen on the "Timeline" arrow may cause an interactive event timeline to be displayed. FIG. 7 shows one such predefined event timeline which sets forth a number of prompts and options for user actions at a predefined pace. Starting from occurrence of a crisis event, an immediate first step is "Initial Assessment" of the crisis event where a core team is made aware of potential crisis and the oversight team member(s) may be notified. A "Click Here" button (next to "Initial Assessment") may take the user to another user interface (e.g., FIG. 8) which shows more detailed instructions for the initial assessment stage as well as buttons (in the lower left corner) for navigation back to the CCS framework screen of FIG. 6 or the event timeline screen of FIG. 7.

As shown in FIG. 7, about fifteen minutes after occurrence of the crisis event, a triage determination on next steps is made. Similarly, a second "Click Here" button (next to "Triage") may take the user to another user interface (e.g., FIGS. 9-10) which shows more detailed instructions for the triage stage and related decision criteria ("Activation Triggers"). Within an hour of the crisis event, the triage decision may cause the crisis management team to either activate a Crisis Command Center to actively deal with the crisis event or hold and monitor the crisis situation (or simply stand down with respect to the crisis event). Detailed instructions or guidance for each of these subsequent steps may be shown on the "Event Timeline" screen in FIG. 7 or other hyperlinked pages such as those illustrated in FIGS. 11-13.

Figure 15:
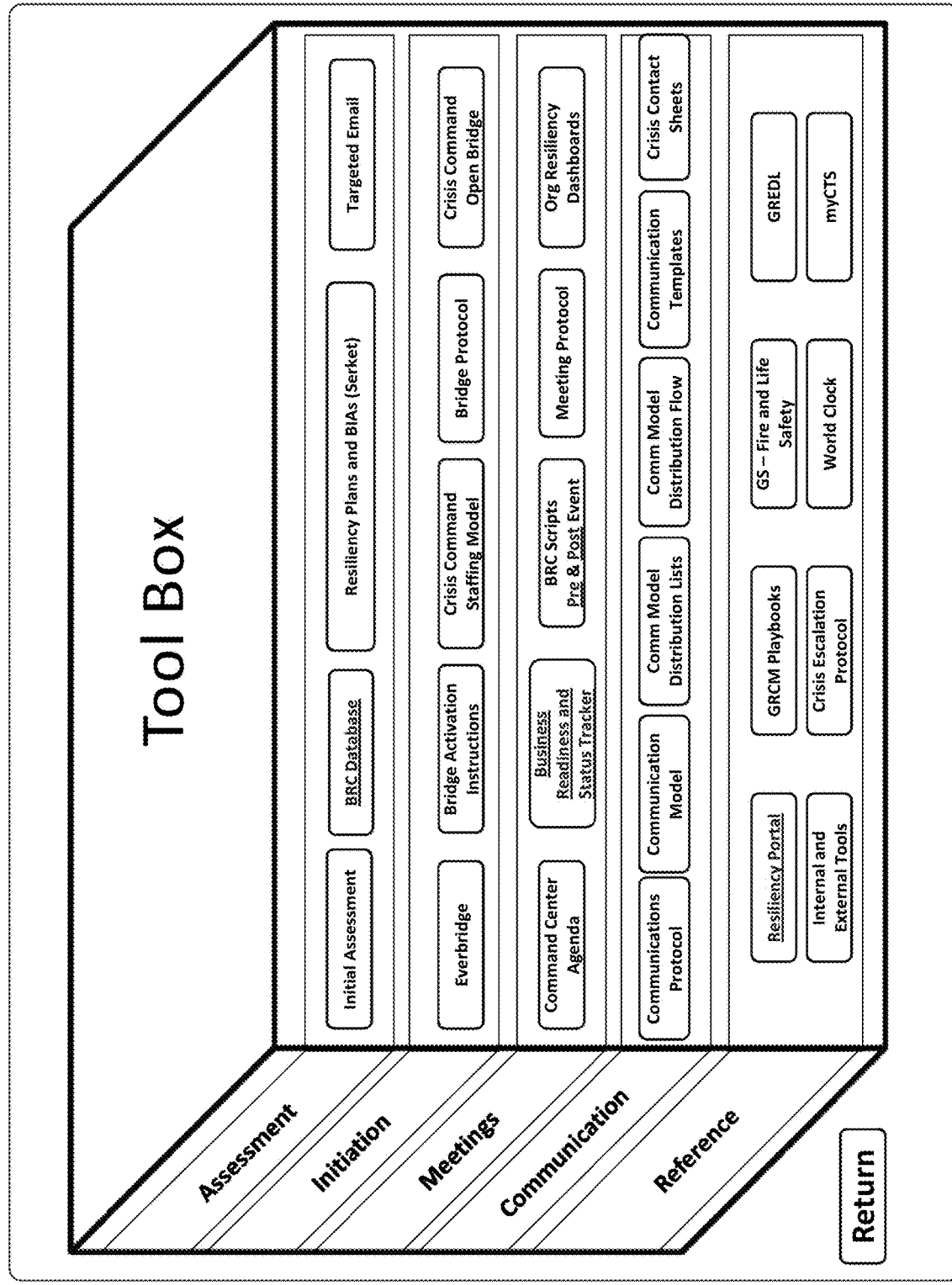

FIG. 6 further shows a "Tool Box" icon which could be clicked by a user to access electronic resources such as a suite of crisis response tools shown in FIG. 15. These tools may be categorized according to their functions or purposes, such as Assessment, Initiation, Meetings, Communication, and References, which represent electronic resources internal to the computer system or electronic document displaying the Tool Box screen of FIG. 15. According to a preferred embodiment, not all the crisis response tools are available to all participants; instead, the tools are made accessible selectively to the various teams and team members based on their predefined or assigned roles and responsibilities in the crisis management procedure. It should be noted the small rectangular buttons in FIGS. 9 and 11-13 which are marked "C-1," "C-2" and so on represent hyperlinks to crisis response tools such as meeting and communication model templates.

Figure 16:
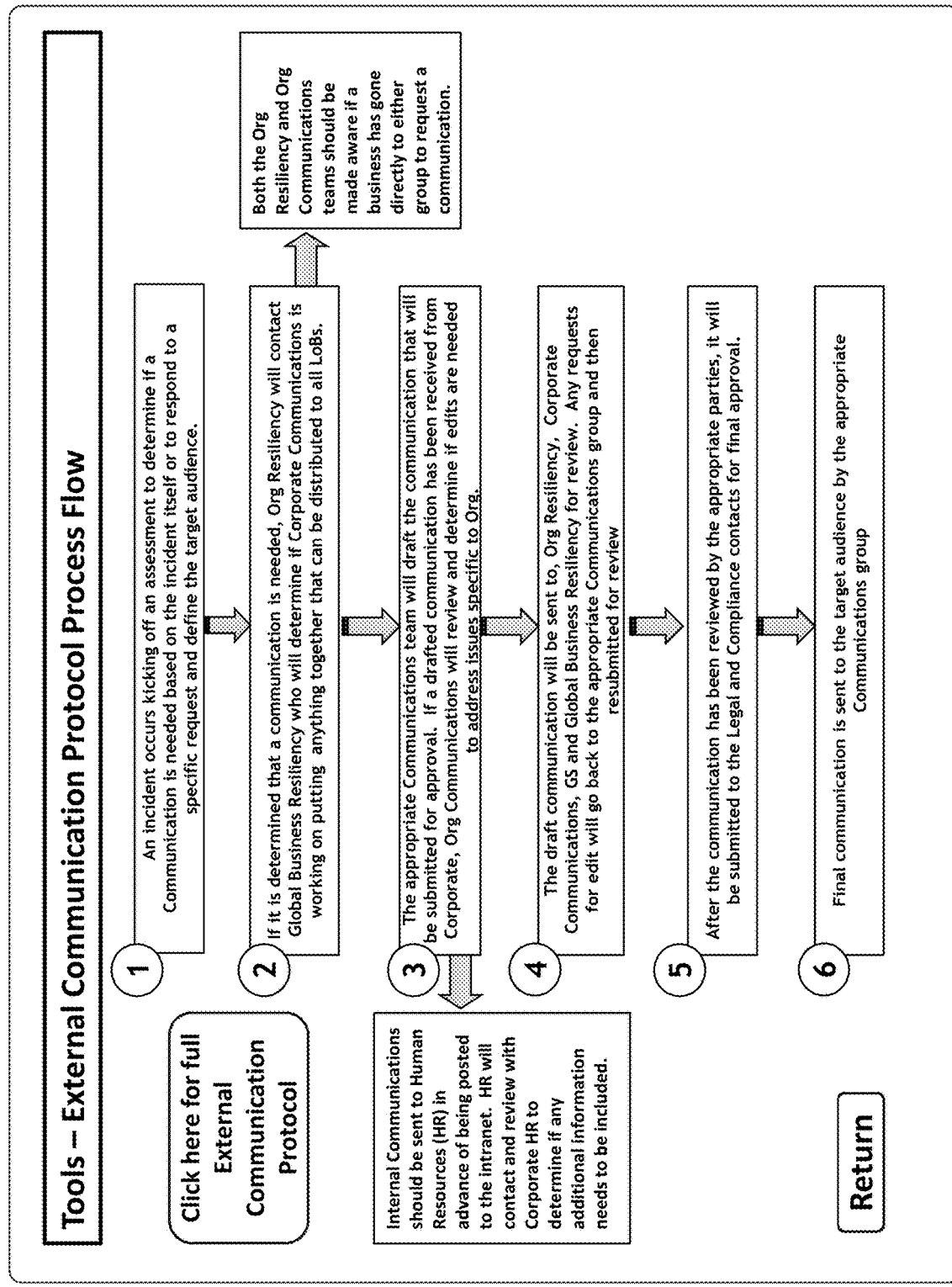

FIG. 16 shows the exemplary user interface for one of those crisis response tools—External Communication Protocol—according to an embodiment of the present invention. A step-by-step process flow is specified for the drafting, review, approval, and distribution of a communication in connection with a crisis event. By requiring the Crisis Management Team as well as various other teams to follow this procedure, the organization may issue consistent messages to the target audience in a coordinated fashion.

FIG. 17 shows the exemplary user interface for another of those crisis response tools—Communication Model—according to an embodiment of the present invention. Apart from hyperlinks to the External Communication Protocol towards the top of the screen, a number of communication models, including their respective purpose, tool or mailbox, template, distribution lists (i.e., target audience), and required approval, are listed for the Triage and Activate stages of the exemplary crisis management procedure. The various communication model templates may be hyperlinked via rectangular clickable buttons.

Figure 18:
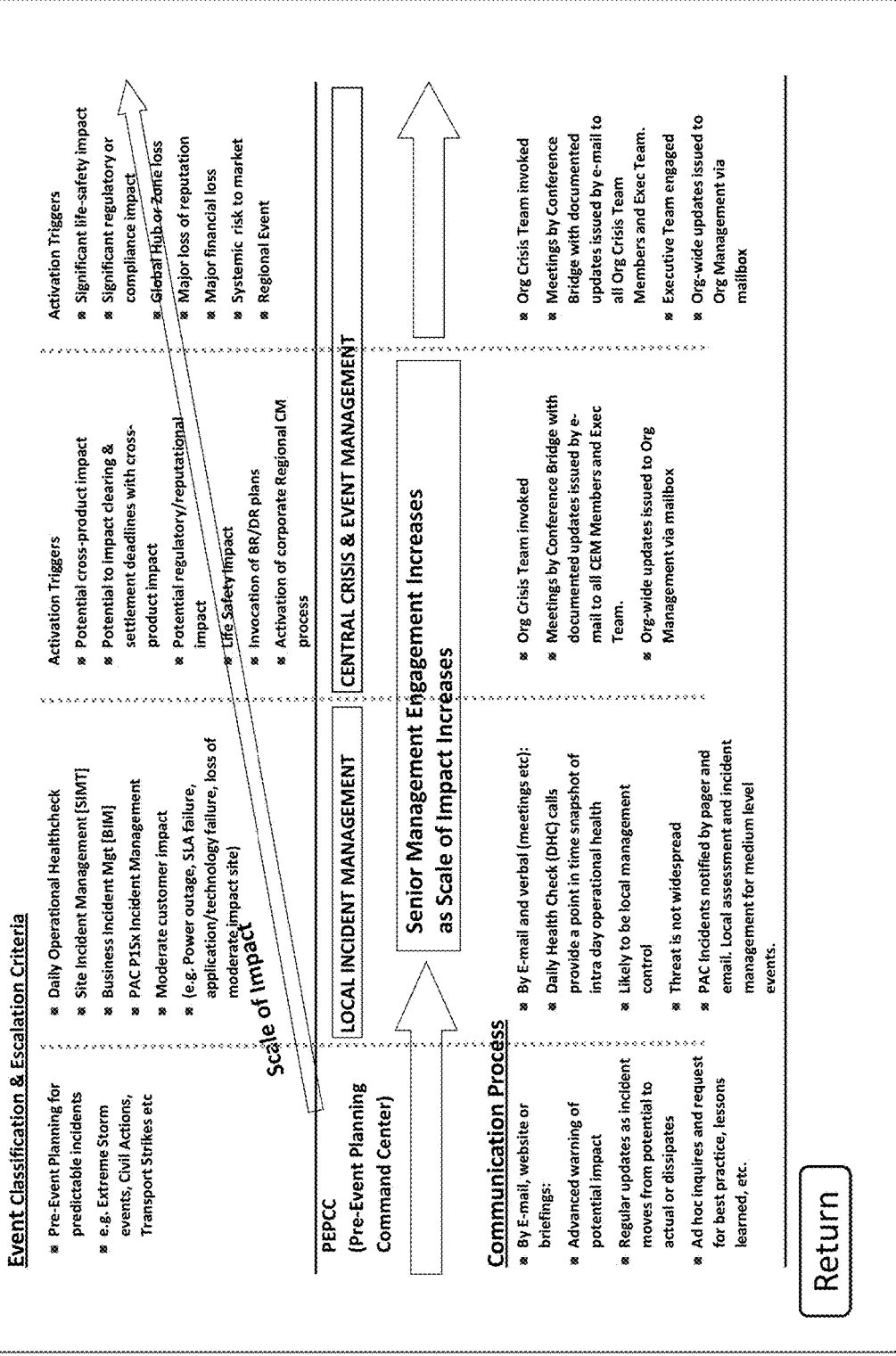

FIG. 18 shows yet another exemplary crisis response tool—Crisis Escalation Protocol—according to an embodiment of the present invention. Based on the scale of impact by a crisis event, the Crisis Escalation Protocol specifies different levels of event classification and escalation criteria and corresponding communication processes.

According to one embodiment of the present invention, some or all of the above-described user interfaces or interactive displays are preferably configured for rendering on each of a number of user computing devices including desktop computers, laptop computers, tablet computers, and mobile computing devices including smart phones. The electronic document or tool for crisis management may be configured as a mobile and/or desktop application compatible with a variety of computing platforms.

Figure 5:
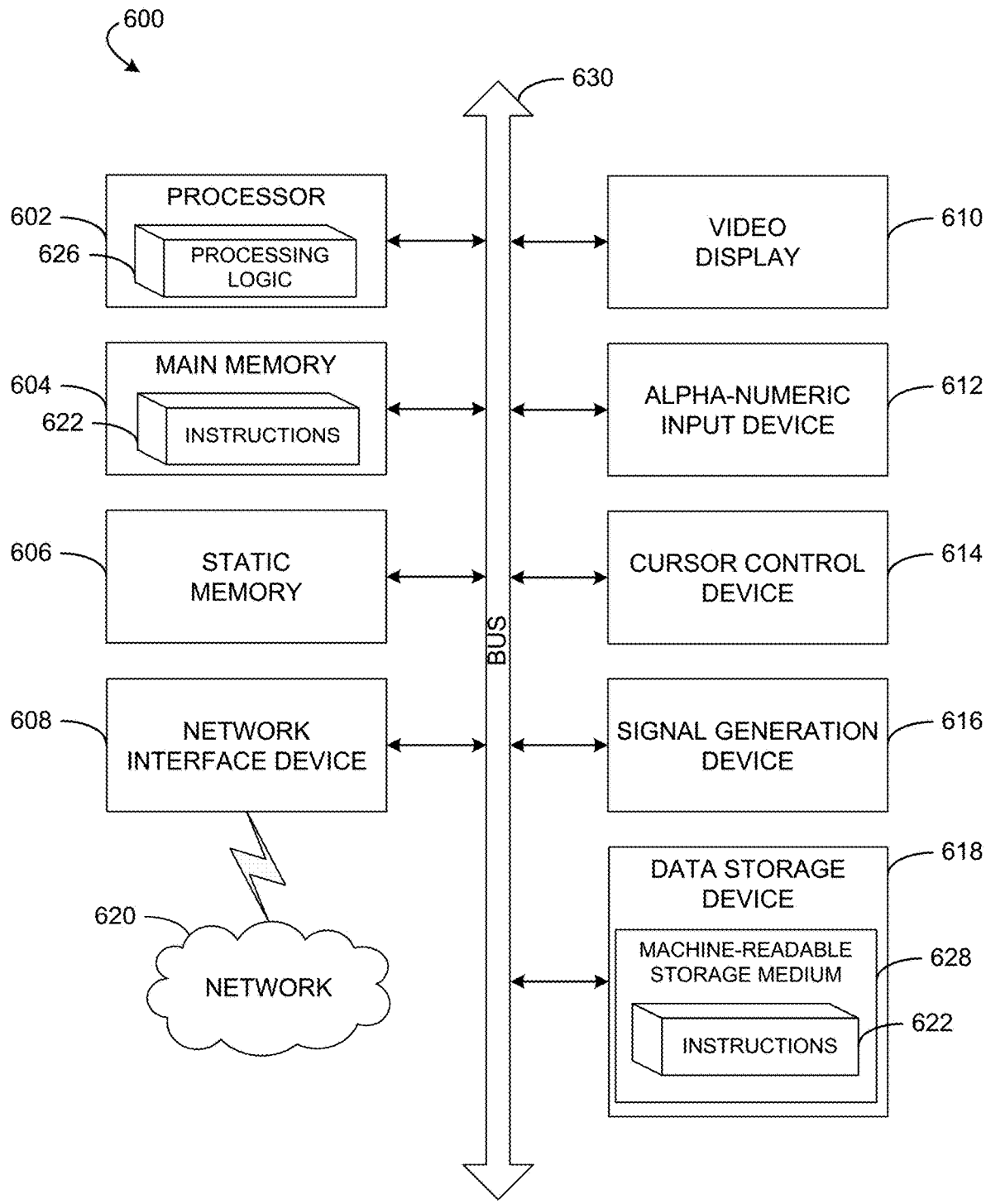
FIG. 5 illustrates a diagrammatic representation of a machine in the exemplary form of a computer system configured to perform one or more of the operations described herein.

FIG. 5 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 may include a processor 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute processing logic 426 for performing the operations and steps discussed herein.

Computer system 600 may further include a network interface device 608. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium 628 (or more specifically a computer-readable storage medium) having one or more sets of instructions (e.g., software 622) embodying any one or more of the methodologies of functions described herein. For example, software 622 may store instructions to implement a crisis management platform. Software 622 may also reside, completely or at least partially, within main memory 604 and/or within processor 602 during execution thereof by computer system 600; main memory 604 and processor 602 also constituting machine-readable storage media. Software 622 may further be transmitted or received over a network 620 via network interface device 608.

Machine-readable storage medium 628 may also be used to store instructions to implement a crisis management platform. While machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall also be taken to include, but not be limited to, transitory computer-readable storage media, including, but not limited to, propagating electrical or electromagnetic signals. The term "machine-readable storage medium" shall also be taken to include non-transitory computer-readable storage media including, but not limited to, volatile and non-volatile computer memory or storage devices such as a hard disk, solid-state memory, optical media, magnetic media, floppy disk, USB drive, DVD, CD, media cards, register memory, processor caches, random access memory (RAM), etc.

Whereas many alterations and modifications of the present invention will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite those features regarded as the invention.

What is claimed is:

1. A computer-implemented method for crisis management, the method comprising:
   creating, by at least one computer processor, an electronic document that includes at least one application program that is automatically initiated by a crisis event alert, the electronic document containing:
   (a) at least one first interactive display that includes a first graphical user interface of a predefined framework that includes a command structure and a timeline that includes user actions at a predefined pace for a crisis management procedure,
     wherein the timeline further includes selectable graphical buttons associated with each event in the crisis management procedure that triggers the corresponding event when selected,
   (b) at least one second interactive display that includes a second graphical user interface of predefined roles and responsibilities of participants in said crisis management procedure,
     wherein the predefined roles and responsibilities for the corresponding participants is displayed by hovering a cursor over a graphical element associated with a grouping of the participants,
   (c) at least one third interactive display that includes a third graphical user interface of step-by-step instructions for said participants to carry out said crisis management procedure according to their respective roles and responsibilities,
     wherein the step-by-step instructions include a graphical component that displays a full listing of external communication protocols in response to an input, and
   (d) at least one interactive instruction for:
     (i) an initial assessment of a crisis event, the crisis event including at least one from among a sudden crash of a stock, a sudden crash of a financial instrument, and a filing of legal action;
     (ii) a triage determination on next steps in response to said crisis event;
     (iii) activation of a crisis command center to deal with said crisis event;
     (iv) holding and monitoring situations related to said crisis event; and
     (v) standing down with respect to said crisis event, the interactive instructions for standing down including a no action instruction that is transmitted to the plurality of potential participants;
   enabling, by the at least one computer processor via the electronic document, access to at least one electronic resource and at least one tool that includes a meetings tool incorporating a meeting protocol and a plurality of dashboards by,
     incorporating, in said at least one first, second, and third interactive displays by the at least one computer processor, one or more hyperlinks to at least one other interactive display and the at least one electronic resource that relates to crisis management information internal or external to said electronic document,
     wherein the one or more hyperlinks are selectable to display the at least one other interactive display and the electronic resource,
     wherein said at least one electronic resource comprises one or more communication protocols that include a step-by-step process flow for drafting, reviewing, approving by a crisis management team, and distributing a communication, and model messaging templates that include at least one predefined message for emergency responses as part of said crisis management procedure; and
     wherein said at least one electronic resource further comprises an audio and video conferencing protocol that automatically identifies at least one conferencing participant based on at least one criterion and the crisis management procedure, the at least one criterion including a time;
   automatically configuring, by the at least one computer processor, said electronic document to be displayable on each of a plurality of computing devices by,
     retrieving user device information that includes at least one association between a plurality of potential participants in said crisis management procedure and the plurality of computing devices, and
     rendering each of the at least one first, second, and third interactive displays based on each of the plurality of computing devices, the plurality of computing devices including desktop computers, laptop computers, tablet computers, and mobile computing devices; and distributing, by the at least one computer processor, said electronic document to the plurality of potential participants.

2. The computer-implemented method according to claim 1, wherein said at least one electronic resource further comprises a suite of crisis response tools accessible via said electronic document by said participants according to their respective roles and responsibilities, the suite of crisis response tools including an escalation protocol that specifies an event classification level and an escalation criterion based on an event scale, and the event scale relating to an impact of a crisis event.

3. The computer-implemented method according to claim 1, wherein said electronic document further comprises engagement protocols for communications among said participants in said crisis management procedure.

4. The computer-implemented method according to claim 1, further comprising:
providing a user interface displaying an interactive event timeline comprising prompts and options for user actions at a predefined pace.

5. The computer-implemented method according to claim 1, wherein said participants in said crisis management procedure comprises: a crisis management team, a corporate communications team, a site incident management team, an oversight lead, a crisis manager, an information manager, a resource manager, a compliance legal team, and a support team.

6. The computer-implemented method according to claim 1, further comprising:
modifying or updating said electronic document during or after a crisis event.

7. The computer-implemented method according to claim 1, further comprising:
automatically initiating communications to some or all of said participants in said crisis management procedure based on said electronic document upon occurrence of a crisis event.

8. The computer-implemented method according to claim 1, further comprising:
receiving, by at least one computer processor, a first notification of an event;
identifying, by at least one computer processor, a first subset of identities from the plurality of potential participants; and
transmitting a second notification of the event to user equipment devices of each of a first plurality of individuals corresponding to the first subset of identities.

9. The computer-implemented method according to claim 8, further comprising:
receiving a user selection of one of a plurality of crisis-related options after transmitting the second notification; and
in response to determining that the user selection corresponds to an activation command:
identifying a second subset of identities from the plurality of potential participants; and
transmitting a third notification of the event to user equipment devices of each of a second plurality of individuals corresponding to the second subset of identities.

10. A computer-implemented system for crisis management comprising a computer platform, the computer platform comprising:

at least one computer processor coupled to one or more data stores and configured to:
create an electronic document that includes at least one application program that is automatically initiated by a crisis event alert, the electronic document containing:
(a) at least one first interactive display that includes a first graphical user interface of a predefined framework that includes a command structure and a timeline that includes user actions at a predefined pace for a crisis management procedure, wherein the timeline further includes selectable graphical buttons associated with each event in the crisis management procedure that triggers the corresponding event when selected,
(b) at least one second interactive display that includes a second graphical user interface of predefined roles and responsibilities of participants in said crisis management procedure, wherein the predefined roles and responsibilities for the corresponding participants is displayed by hovering a cursor over a graphical element associated with a grouping of the participants,
(c) at least one third interactive display that includes a third graphical user interface of step-by-step instructions for said participants to carry out said crisis management procedure according to their respective roles and responsibilities, wherein the step-by-step instructions include a graphical component that displays a full listing of external communication protocols in response to an input, and
(d) at least one interactive instruction for:
(i) an initial assessment of a crisis event, the crisis event including at least one from among a sudden crash of a stock, a sudden crash of a financial instrument, and a filing of legal action;
(ii) a triage determination on next steps in response to said crisis event;
(iii) activation of a crisis command center to deal with said crisis event;
(iv) holding and monitoring situations related to said crisis event; and
(v) standing down with respect to said crisis event, the interactive instructions for standing down including a no action instruction that is transmitted to the plurality of potential participants;
enable, via the electronic document, access to at least one electronic resource and at least one tool that includes a meetings tool incorporating a meeting protocol and a plurality of dashboards by further configuring the at least one computer processor to:
incorporate, in said at least one first, second, and third interactive displays, one or more hyperlinks to at least one other interactive display and the at least one electronic resource that relates to crisis management information internal or external to said electronic document,
wherein the one or more hyperlinks are selectable to display the at least one other interactive display and the electronic resource,
wherein said at least one electronic resource comprises one or more communication protocols that include a step-by-step process flow for drafting, reviewing, approving by a crisis management team, and distributing a communication, and model messaging templates that include at least one predefined message for emergency responses as part of said crisis management procedure; and wherein said at least one electronic resource further comprises an audio and video conferencing protocol that automatically identifies at least one conferencing participant based on at least one criterion and the crisis management procedure, the at least one criterion including a time;

automatically configure said electronic document to be displayable on each of a plurality of computing devices by further configuring the at least one computer processor to:

retrieve user device information that includes at least one association between a plurality of potential participants in said crisis management procedure and the plurality of computing devices, and render each of the at least one first, second, and third interactive displays based on each of the plurality of computing devices, the plurality of computing devices including desktop computers, laptop computers, tablet computers, and mobile computing devices; and distribute said electronic document to the plurality of potential participants.

11. The computer-implemented system according to claim 10, wherein said at least one electronic resource further comprises a suite of crisis response tools accessible via said electronic document by said participants according to their respective roles and responsibilities, the suite of crisis response tools including an escalation protocol that specifies an event classification level and an escalation criterion based on an event scale, and the event scale relating to an impact of a crisis event.

12. The computer-implemented system according to claim 10, wherein said electronic document further comprises engagement protocols for communications among said participants in said crisis management procedure.

13. The computer-implemented system according to claim 10, further configured to:

provide a user interface displaying an interactive event timeline comprising prompts and options for user actions at a predefined pace.

14. The computer-implemented system according to claim 10, wherein said participants in said crisis management procedure comprises: a crisis management team, a corporate communications team, a site incident management team, an oversight lead, a crisis manager, an information manager, a resource manager, a compliance legal team, and a support team.

15. The computer-implemented system according to claim 10, further configured to:

modify or update said electronic document during or after a crisis event.

16. The computer-implemented system according to claim 10, further configured to:

automatically initiate communications to some or all of said participants in said crisis management procedure based on said electronic document upon occurrence of a crisis event.

17. The computer-implemented system according to claim 10, further configured to:

receive a first notification of an event;

identify a first subset of identities from the plurality of potential participants; and transmit a second notification of the event to user equipment devices of each of a first plurality of individuals corresponding to the first subset of identities.

18. The computer-implemented system according to claim 17, further configured to:

receive a user selection of one of a plurality of crisis-related options after transmitting the second notification; and in response to determining that the user selection corresponds to an activation command:

identify a second subset of identities from the plurality of potential participants; and transmit a third notification of the event to user equipment devices of each of a second plurality of individuals corresponding to the second subset of identities.

* * * * *